(12) United States Patent
Egner et al.

(10) Patent No.: US 10,684,225 B2
(45) Date of Patent: Jun. 16, 2020

(54) METHOD AND SCANNING FLUORESCENCE MICROSCOPE FOR MULTI-DIMENSIONAL HIGH-RESOLUTION IMAGING A STRUCTURE OR A PATH OF A PARTICLE IN A SAMPLE

(71) Applicant: Laser-Laboratorium Goettingen e.V., Goettingen (DE)

(72) Inventors: Alexander Egner, Einbeck (DE); Claudia Geisler, Bad Gandersheim (DE); Jennifer-Rose Krueger, Muenster (DE)

(73) Assignee: LASER-LABORATORIUM GOETTINGEN E.V, Goettingen (DE)

( * ) Notice: Subject to any disclaimer, the term of this patent is extended or adjusted under 35 U.S.C. 154(b) by 337 days.

(21) Appl. No.: 15/722,111

(22) Filed: Oct. 2, 2017

(65) Prior Publication Data

US 2018/0024063 A1 Jan. 25, 2018

Related U.S. Application Data

(63) Continuation of application No. PCT/EP2016/057154, filed on Mar. 31, 2016.

(30) Foreign Application Priority Data

Mar. 31, 2015 (DE) .......... 10 2015 105 018

(51) Int. Cl.
*G01N 21/64* (2006.01)
*G02B 21/00* (2006.01)
(Continued)

(52) U.S. Cl.
CPC ......... *G01N 21/6458* (2013.01); *G02B 21/00* (2013.01); *G02B 21/008* (2013.01);
(Continued)

(58) Field of Classification Search
CPC ............... G01N 21/6458; G02B 21/00; G02B 21/0032; G02B 21/0076; G02B 21/008; G02B 21/16; G02B 27/58
See application file for complete search history.

(56) References Cited

U.S. PATENT DOCUMENTS 7,646,481 B2 1/2010 Dyba
7,679,741 B2 3/2010 Dyba
(Continued)

FOREIGN PATENT DOCUMENTS

DE 10 2006 009 833 A1 9/2007
DE 10 2006 026 203 A1 12/2007
(Continued)

OTHER PUBLICATIONS

Klar, Thomas A., Egbert Engel, and Stefan W. Hell. "Breaking Abbe's diffraction resolution limit in fluorescence microscopy with stimulated emission depletion beams of various shapes." Physical Review E 64.6 (2001): 066613. (Year: 2001).*
(Continued)

*Primary Examiner* — Dominic J Bologna
(74) *Attorney, Agent, or Firm* — Thomas | Horstemeyer, LLP

(57) ABSTRACT

For multi-dimensional high-resolution imaging a structure marked with fluorescence markers, fluorescence enabling light is focused to illuminate a measurement area in a sample. A partial area of the measurement area is subjected to fluorescence inhibiting light. The partial area omits a center of the measurement area in that an intensity distribution of the fluorescence inhibiting light comprises a line-shaped intensity minimum. A minimal extension of the intensity minimum in a direction through the center area is by a factor k≥2 smaller than a diameter of the measurement area in said direction. Without spatial resolution, fluorescence light emitted out of the measurement area is measured
(Continued)

for a plurality of consecutive angle positions of the intensity minimum about the center, while the measurement area, for each angle position, is subjected to the fluorescence enabling light. A value of the measured fluorescence light is assigned to the position of the center.

32 Claims, 6 Drawing Sheets

(51) Int. Cl.
    *G02B 27/58* (2006.01)
    *G02B 21/16* (2006.01)
(52) U.S. Cl.
    CPC ..... *G02B 21/0032* (2013.01); *G02B 21/0076* (2013.01); *G02B 21/16* (2013.01); *G02B 27/58* (2013.01)

(56) References Cited

U.S. PATENT DOCUMENTS

| | | | |
|---|---|---|---|
| 7,709,809 | B2 | 5/2010 | Kempe |
| 7,903,247 | B2 | 3/2011 | Geisel |
| 8,705,172 | B2 | 4/2014 | Kleppe |
| 9,104,020 | B2 | 8/2015 | Knebel |
| 9,116,354 | B2 | 8/2015 | Knebel et al. |
| 9,291,562 | B2 | 3/2016 | Hell |
| 2005/0059681 | A1 | 3/2005 | Cremer |
| 2006/0038993 | A1 | 2/2006 | Hell |
| 2007/0206278 | A1 | 9/2007 | Dyba |
| 2008/0007730 | A1* | 1/2008 | Kempe ............ G02B 21/0056 356/318 |
| 2008/0043230 | A1 | 2/2008 | Krampert |
| 2011/0002530 | A1* | 1/2011 | Zhuang ............ G01N 21/6428 382/154 |
| 2011/0115895 | A1* | 5/2011 | Huisken ............ G02B 21/0048 348/79 |
| 2012/0098949 | A1* | 4/2012 | Knebel ............ G02B 21/002 348/79 |
| 2012/0104279 | A1 | 5/2012 | Reuss |
| 2012/0250000 | A1* | 10/2012 | Lanzano ............ G01B 9/04 356/5.1 |
| 2013/0176574 | A1 | 7/2013 | Sirat |
| 2014/0346328 | A1* | 11/2014 | Niu ............ G02B 5/1842 250/225 |

FOREIGN PATENT DOCUMENTS

| | | |
|---|---|---|
| DE | 20 2008 016 287 U1 | 4/2009 |
| DE | 10 2006 062 823 B3 | 11/2010 |
| DE | 20 2011 110 077 U1 | 1/2013 |
| DE | 10 2011 055 367 A1 | 5/2013 |
| DE | 10 2006 009 831 B4 | 7/2013 |
| EP | 1 862 839 A1 | 5/2007 |
| EP | 23 317 362 A1 | 10/2010 |
| EP | 2 444 832 A1 | 6/2011 |
| WO | 2009/085218 A1 | 7/2009 |
| WO | 2010/014244 A2 | 2/2010 |
| WO | 2013/067643 A1 | 5/2013 |

OTHER PUBLICATIONS

V. Westphal and S.W. Hell: Nanoscale Resolution in the Focal Plane of an Optical Microscope, PRL 94, 143903 (2005).
Claus B. Müller and Jörg Enderlein: Image Scanning Microscopy. Physical Review Letters, vol. 104, 198101 (2010).
C. J. R. Sheppard: Super-resolution in confocal imaging. Optik, 80 No. 2 (1988) 53-54.
Stephan Roth, Colin JR Sheppard, Kai Wicker and Rainer Heintzmann: Optical photon reassignment microscopy (OPRA); Optical Nanoscopy 2013, 2:5.
R. Heintzmann and P.A. Benedetti: High-resolution image reconstruction in fluorescence microscopy with patterned excitation, Appl. Opt., OSA, 2006, 45, 5037-5045.
W.H. Richardson: Bayesian-Based Iterative Method of Image Restoration, JOSA 62 (1): 55-59, 1972.
L.B. Lucy and R.N. Hook: Co-Adding Images with different PSF's, Astronomical Soc Pac, 1992.
Thomas Klar et al.: Breaking Abbe's diffraction resolution limit in fluorescence microscopy with stimulated emission depletion beams of various shapes, Phys. Rev. E, vol. 64, No. 6 (2001).
PCT International Preliminary Report on Patentability in co-pending related PCT Application No. PCT/EP2016/057154 dated Oct. 3, 2017.

* cited by examiner

METHOD AND SCANNING FLUORESCENCE MICROSCOPE FOR MULTI-DIMENSIONAL HIGH-RESOLUTION IMAGING A STRUCTURE OR A PATH OF A PARTICLE IN A SAMPLE

CROSS REFERENCE TO RELATED APPLICATIONS

This application is a continuation of International Application PCT/EP2016/057154 with an International Filing Date of Mar. 31, 2016 and claiming priority to German Patent Application No. DE 10 2015 105 018.8 entitled "Verfahren and Rasterfluoreszenzlichtmikroskop zum mehrdimensional hochauflösenden Abbilden einer Struktur oder eines Wegs eines Partikels in einer Probe", filed Mar. 31, 2015.

FIELD

The present invention relates to a method for multi-dimensional high-resolution imaging a structure of a sample, the structure being marked with fluorescence markers, and the method comprising subjecting a measurement area to fluorescence enabling light, subsequently subjecting a partial area of the measurement area to fluorescence inhibiting light, and measuring fluorescence light emitted out of the measurement area.

The invention also relates to a method of multi-dimensional high-resolution imaging a path of a particle in a sample, the particle being marked with a fluorescence marker, and the method comprising the same steps of subjecting and measuring as mentioned above.

Further, the present invention relates to scanning fluorescence light microscopes for executing these methods.

BACKGROUND

Like any other light, fluorescence enabling light may not be localized in a sample stronger than down to Abbe's diffraction limit at the wavelength of the fluorescence enabling light. Even under optimum optical conditions Abbe's diffraction limit is at half of the respective wavelength. With regard to the fluorescence light emitted out of the sample, Abbe's diffraction limit at the wavelength of the fluorescence light applies to assigning the fluorescence light to a certain area of the sample. Correspondingly, a measurement area, both in subjecting it to the fluorescence enabling light and in measuring the fluorescence light, may not be made smaller than the diffraction limit at the wavelength of the fluorescence enabling light and the fluorescence light, respectively. By means of fluorescence inhibiting light, the spatial resolution in imaging a structure or in tracking a particle in a sample may be increased beyond Abbe's diffraction limit. If a partial area of a measurement area which is subjected to the fluorescence inhibiting light covers the entire measurement area except of an intensity minimum of an intensity distribution of the fluorescence inhibiting light, the measured fluorescence light may only stem from this intensity minimum and may thus be assigned to the position of this intensity minimum in the sample. The dimensions of an intensity minimum of the fluorescence inhibiting light in which the intensity of the fluorescence inhibiting light is zero or at least so small that the fluorescence inhibiting light does not inhibit the emission of fluorescence light completely, whereas the intensity of fluorescence inhibiting light outside of this intensity minimum is so high that it completely inhibits the emission of fluorescence light by the fluorescence markers, may be reduced far below the diffraction limit at the wavelength of the fluorescence inhibiting light and thus also at the wavelengths of the fluorescence enabling light and the fluorescence light by means of increasing the light intensity of the fluorescence inhibiting light. As a result, a spatial resolution is achieved in imaging the structure of interest or in tracking a particle of interest in the sample, which is by a factor of at least 5, 10 or even more better than in common confocal scanning fluorescence light microscopy.

The fluorescence inhibiting light may inhibit the emission of fluorescence light by the fluorescence markers in different ways. In stimulated emission depletion (STED) fluorescence light microscopy, the fluorescence enabling light is fluorescence exciting light which transfers the fluorescence markers via an electronic transition into an excited state out of which the fluorescence markers return into their ground state under spontaneous emission of fluorescence light. The fluorescence inhibiting light depletes the excited state in that it stimulates the fluorescence marker for the emission of light at another wavelength than that one of the fluorescence light, which due its different wavelength can be separated from the fluorescence light which is spontaneously emitted out of the intensity minimum of the fluorescence inhibiting light.

In STED scanning fluorescence light microscopy, the fluorescence inhibiting light has to have a very high intensity outside the intensity minimum to de-excite again the fluorescence markers which have been excited for emission of fluorescence light by means of the fluorescence enabling light by means of stimulated emission before they spontaneously emit fluorescence light as the lifetime of the excited electronic state of the fluorescence markers is only short.

In REversible Saturable Optical Fluorescence Transitions (RESOLFT) scanning fluorescence light microscopy using switchable fluorophores, the fluorescence enabling light switches the fluorescence markers into a fluorescent state in which they are excitable for spontaneous emission of fluorescence light by additional fluorescence exciting light. By means of fluorescence inhibiting light, the switched on fluorescence markers are switched off again except of those in the area of the intensity minimum of the fluorescence inhibiting light. Fluorescence light whose emission is afterwards excited by additional fluorescence exciting light may then only stem from the area of the intensity minimum of the fluorescence inhibiting light.

In RESOLFT scanning fluorescence light microscopy, lower intensities of the fluorescence inhibiting light than in STED scanning fluorescence light microscopy are sufficient, because the switched on state of the fluorescence markers, even if not stable, has at least a longer lifetime than an electronic state out of which the fluorescence markers emit the fluorescence light. On the other hand, special switchable fluorescence markers are needed.

In Ground State Depletion (GSD) scanning fluorescence light microscopy, fluorescence markers are transferred by the fluorescence inhibiting light via an electronic transition out of their ground state into a dark state in which they are not excitable for the spontaneous emission of fluorescence light when subjecting the sample to fluorescence excitation light as fluorescence enabling light. Fluorescence light measured afterwards may also here only stem from the intensity minimum of the fluorescence inhibiting light.

In GSD scanning fluorescence light microscopy, it is difficult to transfer the fluorescence markers completely into their dark state on the one hand, and to quickly return them back into their ground state, when a neighboring measurement area of the sample is to measured, on the other hand.

V. Westphal and S. W. Hell: Nanoscale Resolution in the Focal Plane of an Optical Microscope, PRL 94, 143903 (2005) disclose a method of high-resolution imaging a structure of a two-dimensional sample, the structure being marked with fluorescence markers, and the method belonging to STED scanning fluorescence light microscopy. In addition to excitation light having a central intensity maximum, fluorescence inhibiting light is provided with a line-shaped intensity minimum. In a comparison example, two partial intensity distributions of the fluorescence inhibiting light which each comprise a line-shaped intensity minimum are superimposed with orthogonal lines to define a point-shaped intensity minimum. For forming the two partial intensity distributions, the fluorescence inhibiting light is split up into two partial beams. With a fixed light power of the fluorescence inhibiting light, a maximum spatial resolution is achieved when using the fluorescence inhibiting light with the line-shaped intensity minimum. This maximum spatial resolution is achieved in a spatial direction orthogonal to the line-shaped intensity minimum. In the direction of the line-shaped intensity minimum, however, the spatial resolution is only that one of a confocal scanning fluorescence light microscope. When the spatial resolution is increased in both spatial directions of the two-dimensional sample by means of the point-shaped intensity minimum using the same light power of the fluorescence inhibiting light, the spatial resolution is considerably smaller than the maximum spatial resolution achieved by means of a line-shaped intensity minimum of the fluorescence inhibiting light.

US patent application publication US 2012/0104279 A1 discloses a method of high-resolution imaging a structure of a sample marked with fluorescence markers, which, in one embodiment, belongs to STED scanning fluorescence light microscopy. This known method may, however, also be executed according to GSD or RESOLFT scanning fluorescence light microscopy. Fluorescence inhibiting light is provided with a donut-shaped intensity distribution around a point-shaped intensity minimum. The field vector of the electrical field in the donut may rotate or have a fixed orientation to either inhibit the fluorescence of all fluorescence markers in the area of the donut independently on their dipole orientation, or to purposefully only inhibit fluorescence of those fluorescence markers whose dipoles are orthogonal to the fixed orientation of the field vector.

US patent application publication US 2007/0206278 A1 discloses a method of high-resolution imaging a structure of a two-dimensional sample marked with fluorescence markers, which may be implemented as a method of either RESOLFT or GSD scanning fluorescence light microscopy. In the RESOLFT embodiment of the known method, the fluorescence markers in the sample are at first transferred into a state in which they are able to fluoresce by means of fluorescence enabling light in a line-shaped measurement area. In the GSD embodiment of the known method, it is waited until the fluorescence markers have returned into their ground state in which they are able to fluoresce. In both embodiments, the fluorescence markers in the line-shaped measurement area are then subjected to an intensity distribution of fluorescence inhibiting light which transfers the fluorescence markers, except of those fluorescence markers which are located in a line-shaped intensity minimum of the fluorescence inhibiting light in the center of the line-shaped measurement area, out of their state in which they are able to fluoresce into a dark state. Afterwards, the fluorescence markers in the line-shaped measurement area are subjected to fluorescence excitation light. The fluorescence light which is then emitted out of the line-shaped measurement area of the sample is measured with a line detector, i.e. with a detector spatially resolving in a direction along the line. The steps described here are repeated for a plurality of measurement areas to scan the sample with the line-shaped intensity minimum of the fluorescence inhibiting light. This scanning may be sequently executed with different orientations of the line-shaped intensity minimum of the fluorescence inhibiting light, and from the plurality of images of the sample obtained in this way, an overall image may be calculated mathematically which has an increased spatial resolution in several spatial directions. The known method shall speed up scanning of the sample as compared to a pointwise scan. Very high intensities of the fluorescence inhibiting light which are needed for STED scanning fluorescence light microscopy may not be realized over an extended line-shaped measurement area in a suitable way, because the light power of the fluorescence inhibiting light is distributed over a too large sample volume.

US patent application publication US 2013/0176574 A1 discloses a method and a scanning fluorescence light microscope for multi-dimensional high-resolution imaging a structure of a sample, the structure being marked with fluorescence markers. Here, the sample is only subjected to fluorescence excitation light. The fluorescence excitation light is focused to a measurement area with diffraction-limited dimensions, and fluorescence light emitted out of the measurement area is measured with a point detector. For increasing the spatial resolution, the phase fronts of the fluorescence excitation light are modulated prior to focusing the fluorescence excitation light within the sample in such a way that different interference patterns are formed in the measurement area. These interference patterns may include interference patterns having line-shaped intensity minima oriented at different angles. The sample is completely scanned with each of these interference patterns, and the measurement values of the fluorescence light belonging to the different interference patterns are mathematically evaluated together to obtain an image with a spatial resolution increased better than the size of the measurement area. Alternatively, all different interference patterns may be adjusted successively at each point of the sample, before the next point is measured in scanning the sample with the measurement area. In this embodiment, the fluorescence light emitted out of the measurement area is also separately registered for each of the different interference patterns.

German patent application publication DE 10 2011 055 367 A1 (corresponding to U.S. Pat. No. 9,291,562 B2) discloses a method and a scanning fluorescence light microscope for tracking a movement of a particle in a sample, the particle being marked with a fluorescence marker. Fluorescence excitation light having an intensity distribution with a spatially limited minimum is directed onto the sample, and the minimum is guided to track the particle moving within the sample in that the intensity distribution of the fluorescence excitation light is shifted with regard to the sample in such a way that a rate of photons of the fluorescence light emitted by the particle remains minimal. The rate of photons of the fluorescence light emitted by the particle only remains minimal if the particle remains in the minimum of the intensity distribution of the fluorescence excitation light. Different phase relations between light beams from which the intensity distribution of the fluorescence excitation light is generated by means of interference may successively result in line-shaped or plane-shaped minima oriented in different directions. These line-shaped or plane-shaped minima oriented in different directions are called rotating stripes and have a point or a line as their spatial intersection. With rapidly switching over between such different phase relations and with keeping the rate of photons minimal for each of these phase relations individually or over the entirety of the different phase relations, the movement of the particle in the sample can be tracked in all three dimensions.

In Image Scanning Microscopy (ISM), a structure in a sample which is marked with fluorescence markers is scanned with a diffraction-limited measurement area into which fluorescence excitation light is focused as fluorescence enabling light in a same way as in common confocal scanning fluorescence light microscopy. In contrary to common confocal scanning fluorescence light microscopy, for each position of the measurement area, the fluorescence light emitted from the sample out of the measurement area is registered not just confocally but with a sensor array, the intensity distribution of the fluorescence light over the sensor array being registered. Due to the diffraction limit, the diffraction-limited measurement area may not be resolved spatially by means of the sensor array. Nevertheless, additional information with regard to the position of the fluorescence light emitting fluorescence markers is obtained. At first, four- or five-dimensional data sets are produced in which two or three dimensions correspond to the position of the measurement area in the sample and two further dimensions correspond to the coordinates within the sensor array at which the fluorescence light has been registered for the respective position of the measurement area. From these data sets, a final image having an increased spatial resolution may be calculated. The maximum spatial resolution which is achievable in this way corresponds to the spatial resolution achievable in Structured Illumination Microscopy (SIM), and it is by a factor of 2 better than the spatial resolution in common confocal scanning fluorescence light microscopy. A method of ISM and a corresponding scanning fluorescence light microscope are, for example, described in European patent application publication EP 2 317 362 A1 (corresponding to U.S. Pat. No. 8,705,172 B2). In more detail, ISM is described by Claus B. Müller and Jörg Enderlein: Image Scanning Microscopy. Physical Review Letters, Vol. 104, 198101 (2010). The mathematical basics of ISM have already been disclosed by C. J. R. Sheppard: Super-resolution in confocal imaging. Optik, 80 No. 2 (1988) 53-54.

A direct optical realization of the evaluation which in ISM is otherwise executed mathematically is described by Stephan Roth, Colin J R Sheppard, Kai Wicker and Rainer Heintzmann: Optical photon reassignment microscopy (OPRA); Optical Nanoscopy 2013, 2:5.

There still is a need of a method of multi-dimensional high-resolution imaging a structure of a sample, the structure being marked with fluorescence markers, which achieves a desired spatial resolution in all of the multi dimensions at a lower light power of the fluorescence inhibiting light. Further, a corresponding method of multi-dimensional high-resolution imaging a path of a particle in a sample, the particle being marked with a fluorescence marker, and scanning fluorescence light microscopes for carrying out these methods are needed.

SUMMARY OF THE INVENTION

The present invention relates to a method of multi-dimensional high-resolution imaging a structure of a sample, which is marked with fluorescence markers. The method comprises focusing fluorescence enabling light into the sample, the focused fluorescence enabling light illuminating a measurement area in the sample; subjecting a partial area of the measurement area to fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is by a factor $k \geq 2$ smaller than a diameter of the measurement area in said direction; measuring fluorescence light emitted from the sample out of the measurement area without spatial resolution within the measurement area, wherein the fluorescence light emitted out of the measurement area is measured for a plurality of consecutive angle positions of the intensity minimum about the center, and wherein the measurement area, for each angle position of the intensity minimum, is subjected to the fluorescence enabling light, and assigning a value of the measured fluorescence light to a location defined by the position of the center of the measurement area in the sample. The steps of focusing, subjecting, measuring and assigning are repeated for each measurement area of a plurality of measurement areas in the sample.

Further, the present invention relates to a of multi-dimensional high-resolution imaging a path of a particle in a sample, the particle being marked with a fluorescence marker. This method comprises focusing fluorescence enabling light into the sample, the focused fluorescence enabling light illuminating a measurement area in the sample; subjecting a partial area of the measurement area to fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is by a factor $k \geq 2$ smaller than a diameter of the measurement area in said direction; measuring fluorescence light emitted from the sample out of the measurement area without spatial resolution within the measurement area, wherein the fluorescence light emitted out of the measurement area is measured at a temporal resolution for a plurality of consecutive angle positions of the intensity minimum about the center, wherein the temporal resolution resolves the angle positions of the intensity minimum in the measured fluorescence light, and wherein the measurement area, for each angle position of the intensity minimum, is subjected to the fluorescence enabling light; measuring the fluorescence light emitted from the sample out of the measurement area without spatial resolution with the measurement area, wherein the fluorescence light emitted out of the measurement area is measured with spatial resolution for a plurality of consecutive angle positions of the line-shaped or plane-shaped intensity minimum about the center, wherein the temporal resolution resolves the angle positions of the intensity minimum in the measured fluorescence light, and wherein the measurement area is subjected to the fluorescence enabling light for each of the angle positions of the intensity minimum; and updating a position of the center of the measurement area in the sample such that a predetermined temporal course of intensities of the fluorescence light measured over the plurality of angle positions of the line-shaped or plane shaped intensity minimum is maintained. Here, the steps of focusing, subjecting, measuring and updating are repeated for a plurality of measurement areas in the sample.

Further, the present invention relates to a scanning fluorescence light microscope for multi-dimensional high-resolution imaging a structure of a sample, which is marked with fluorescence markers. The scanning fluorescence light microscope comprises a fluorescence enabling light source providing fluorescence enabling light and configured to illuminate a measurement area in the sample with the focused fluorescence enabling light; and a fluorescence inhibiting light source providing fluorescence inhibiting light and configured to subject a partial area of the measurement area to the fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is by a factor k≥2 smaller than a diameter of the measurement area in said direction. The scanning fluorescence light microscope also comprises a detector configured to measure fluorescence light emitted from the sample out of the measurement area without spatial resolution within the measurement area; a coding device configured to assign a value of the measured fluorescence light to a location defined by the position of the center of the measurement area in the sample; and a scanning device configured to scan a spatial area of interest of the sample with the center of the measurement area: The fluorescence inhibiting light source has an angle adjusting device configured to adjust a plurality of consecutive angle positions of the intensity minimum about the center of the measurement area, wherein the fluorescence enabling light source is configured to subject the measurement area to the fluorescence enabling light for each angle position of the intensity minimum. The detector is configured to measure the fluorescence light emitted out of the measurement area for the plurality of consecutive angle positions of the intensity minimum about the center of the measurement area.

Further, the present invention relates to a scanning fluorescence light microscope for multi-dimensional high-resolution imaging a path of a particle in a sample, the particle being marked with a fluorescence marker. The scanning fluorescence light microscope comprises a fluorescence enabling light source providing fluorescence enabling light and configured to illuminate a measurement area in the sample with the focused fluorescence enabling light; and a fluorescence inhibiting light source providing fluorescence inhibiting light and configured to subject a partial area of the measurement area to the fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is by a factor k≥2 smaller than a diameter of the measurement area in said direction. The scanning fluorescence light microscope also comprises a detector configured to measure fluorescence light emitted from the sample out of the measurement area without spatial resolution within the measurement area; and a tracking device configured to update a position of the center of the measurement area in the sample. The fluorescence inhibiting light source has an angle adjusting device configured to adjust a plurality of consecutive angle positions of the intensity minimum about the center of the measurement area, wherein the fluorescence enabling light source is configured to subject the measurement area to the fluorescence enabling light for each angle position of the intensity minimum. The detector is configured to measure the fluorescence light emitted out of the measurement area for the plurality of consecutive angle positions of the intensity minimum about the center of the measurement area at a temporal resolution; and the tracking device is configured to update a position of the center of the measurement area in the sample such that a predetermined temporal course of intensities of the fluorescence light measured over the plurality of angle positions of the line-shaped or plane shaped intensity minimum is maintained.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
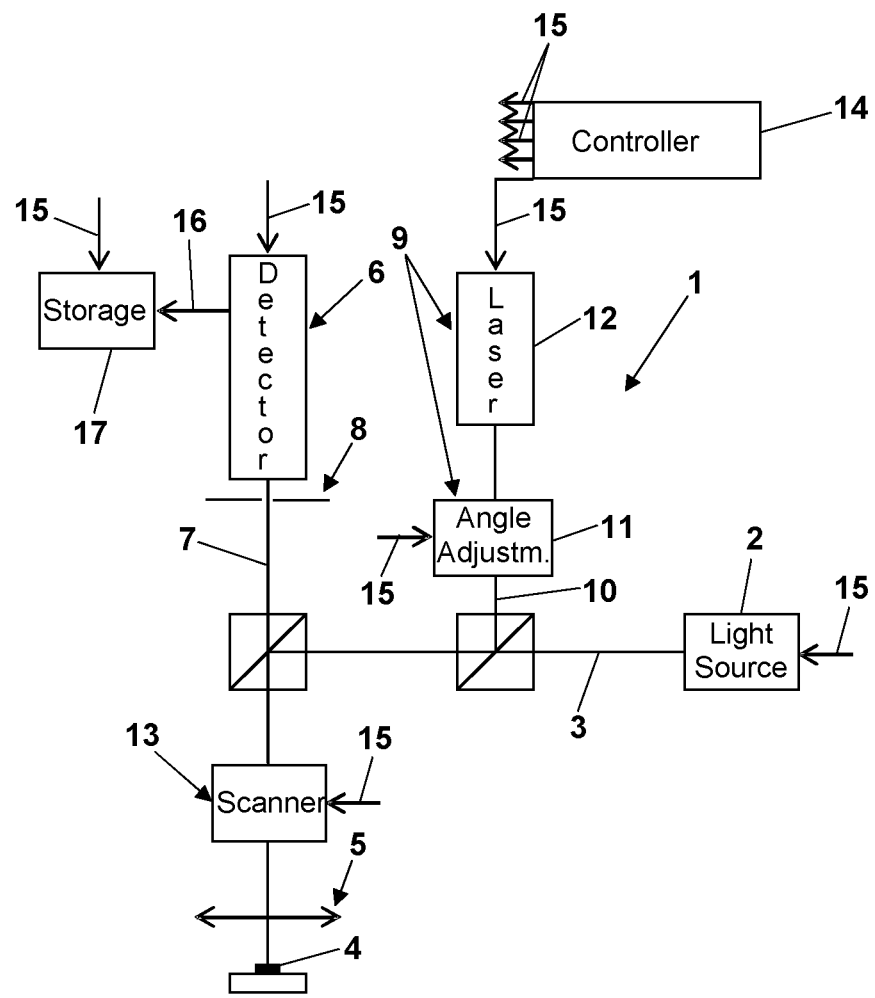
FIG. 1 schematically shows a scanning fluorescence light microscope according to the present invention.

In a method according to the present invention of multi-dimensional high-resolution imaging a structure of a sample, the structure being marked with fluorescence markers, the following steps are repeated for each one of a plurality of measurement areas in the sample: The measurement area is at first subjected to fluorescence enabling light, i.e. with fluorescence excitation light in case of an STED embodiment of the method. The fluorescence enabling light is focused into the sample, and the area illuminated by the fluorescence enabling light within the sample is the measurement area. As a rule, the measurement area is circular, this means that it has a circular cross section orthogonal to the direction out of which the sample is subjected to the fluorescence enabling light.

Then, a partial area of the measurement area is subjected to fluorescence inhibiting light, wherein the partial area avoids or omits a center of the measurement area in that an intensity distribution of the fluorescence inhibiting light has a line-shaped or plane-shaped intensity minimum extending across the center. In so far as in the following only a line-shaped intensity minimum instead of a line or plane-shaped intensity minimum is mentioned, this shall always also refer to a plane-shaped intensity minimum as long as nothing else is explicitly indicated or something else clearly results from the respective circumstances.

In the STED embodiment of the method, the fluorescence inhibiting light is STED light, i.e. light which stimulates the fluorescence markers excited with the fluorescence excitation light for the emission of other light than the fluorescence light and thus de-excites the fluorescence markers again. Due to the fact that the intensity minimum is line-shaped and extends across the center of the measurement area, the partial area of the measurement area in which the fluorescence inhibiting light inhibits an emission of fluorescence light does not only avoid the center of the measurement area but the entire area of the line-shaped intensity minimum. Due to the diffraction limit, the fluorescence light emitted from the sample out of the measurement area is measured without spatial resolution within the measurement area.

The fluorescence light is measured for a plurality of consecutive angle positions of the intensity minimum about the center, wherein, for each of the angle positions of the intensity minimum, the measurement area is subjected to the fluorescence enabling light. I.e. with equal subjection of the measurement area to the fluorescence enabling light, the fluorescence light emitted out of the same measurement area is measured for different angle positions of the intensity minimum of the fluorescence inhibiting light. At least, the fluorescence light emitted out of the measurement area is measured for two different angle positions of the intensity minimum about the center, and the measured fluorescence light is assigned to a location which is defined by the position of the center within the sample.

Independently on its further evaluation, the fluorescence light measured for the at least two different angle positions of the intensity minimum about the center includes information on the structure of interest in the sample marked with the fluorescence markers, which information has a spatial resolution equal to a minimal extension of the intensity minimum through the center of the measurement area. In the method of the present invention, this minimal extension of the intensity minimum is by a factor $k \geq 2$ smaller than a diffraction limited diameter of the measurement area. This factor k corresponds to the enhancement of the spatial resolution in the method according to the present invention as compared to taking a confocal scanning fluorescence light microscopic image of the structure. The factor k may be clearly higher than 2, like for example higher than 5 or even higher than 10. If the factor k=5, this means that, with a diffraction-limited diameter of the measurement area of d, the minimal extension of the intensity minimum is $d/k=d/5$.

In the method according to the present invention, the respective factor k, which despite the line- or plane-shape of the intensity minimum results as an enhancement of the spatial resolution in all dimensions in which the respective structure of interest is imaged, is achieved with an unusual low light power of the fluorescence inhibiting light. Particularly, for imaging a structure in a two-dimensional sample using the line-shaped intensity minimum only about a half and by trend even slightly less than 50% of the light power is required which is needed for achieving the same spatial resolution in both spatial directions of the sample using a point-shaped intensity minimum. That only about half of the light power is needed as compared to a point-shaped intensity minimum may be explained by the fact that, in the method according to the present invention, the center of the measurement area in a two-dimensional sample is only delimited in one and not in two directions. This explanation even withstands a more thorough reexamination. The additional advantage with regard to the light power, i.e. that even less than half of the light power is needed for the same spatial resolution, may be due to the fact that it is easier to form a line-shaped intensity minimum than to form a point-shaped intensity minimum without compromising the yield of fluorescence light out of the center of the measurement area.

In the method according to the present invention, the enhanced spatial resolution in all spatial directions is achieved in another way than by V. Westphal and S. W. Hell: Nanoscale Resolution in the Focal Plane of an Optical Microscope, PRL 94, 143903 (2005), i.e. not in that several partial intensity distributions of the fluorescence inhibiting light are superimposed such that the dimensions of the intensity minimum of the entire fluorescence inhibiting light only correspond to the dimensions of an intersection of the individual intensity minimums of the individual partial intensity distributions. Instead, the sample is subjected to fluorescence enabling light for each angle position of the non-point-shaped but line-shaped or plane shaped intensity minimum so that for each angle position fluorescence light out of the entire line-shaped or plane-shaped intensity minimum is registered.

In the method according to the present invention, a generally higher spatial resolution in all dimensions is achieved than in the method known from US patent application publication US 2007/0206278 A1. This is inter alia due to the fact that the intensity of the fluorescence enabling light declines from the center of the measurement area in all spatial directions and that, thus, the Point Spread Function (PSF) declines in all spatial directions which is not the case in the extension direction of the line-shaped measurement area according to US 2007/0206278 A1.

In certain embodiments of the method according to the present invention, at least not only, different scanning fluorescence light microscopic images of the structure are taken with different angle positions of the intensity minimum and then mathematically combined to calculate an image of the structure with high resolution in all spatial directions. Instead, alternatively or additionally, an intensity sum of at least a part of the fluorescence light measured for each of the several angle positions may be added up over the several angle positions of the intensity minimum to obtain the spatial distribution of this intensity sum as a first scanning fluorescence light microscopic image of the structure of interest with high resolution in all spatial directions. This image of the structure may then be further evaluated and processed.

The intensity sum may, for example, be generated in that the entire fluorescence light emitted out of the measurement area is added up over the several angle positions of the intensity minimum of the fluorescence inhibiting light about the center. For such a generation of the intensity sum, the different angle positions of the intensity minimum about its center have to be adjusted in a direct consecution for the respective measurement area. The fluorescence light emitted out of the sample may then be measured in a most simple way, i.e. without temporal resolution, while adjusting the different angle positions of the intensity minimum.

Generally, the method according to the present invention of multi-dimensional high-resolution imaging a structure of a sample, which is marked with fluorescence markers, may, however, also be executed in such a way that the entire sample or at least an area of interest of the sample is at first completely scanned with the measurement area with one angle position of the intensity minimum before the next angle position of the intensity minimum is adjusted and the complete scan is repeated. Further, it is possible lo scan the sample line by line with the different angle positions of the intensity minimum. In this case as well, the fluorescence light emitted out of each measurement area is measured for several consecutive angle positions of the intensity minimum about the center, wherein for each angle position of the intensity minimum the measurement area is subjected to fluorescence enabling light. The intensity sum may then not be generated using directly temporally consecutive measurement values of the fluorescence light or their parts but using measurement values or their parts which are temporally separated but associated with the same measurement area in the sample.

A part of the fluorescence light emitted out of the measurement area which may be added up over the several angle positions to generate the intensity sum and which includes particularly much spatially high resolved information about the structure of interest in the sample is a direct component or constant part of the fluorescence light emitted out of the measurement area which remains constant over the several angle positions of the intensity minimum.

Even if the fluorescence light emitted out of the measurement area over the several consecutive angle positions of the intensity minimum about the center is measured in a direct consecution for a respective measurement area, this measurement may be made at a temporal resolution, particularly at such a high temporal resolution that the several consecutive angle positions of the intensity minimum are resolved with regard to the fluorescence light emitted out of the area of the intensity minimum having a certain angle position.

Independently on the way in which this is achieved, such a resolution of the measured fluorescence light with regard to the underlying different angle positions of the intensity minimum about the center of the measurement area may be used to predominantly or even only evaluate the fluorescence light which belongs to angle positions of the intensity minimum in which the intensity minimum runs perpendicular to a course of the structure of interest in the sample so that this course is resolved at a particularly high spatial resolution.

Such a resolution of the measured fluorescence light with regard to the several consecutive angle positions of the intensity minimum may also be used for tracking the course of a connected structure in the sample which is marked with fluorescence markers without scanning the entire sample. Particularly, the measurement areas may be purposefully arranged in the direction of the angle positions of the intensity minimum in which the fluorescence light has its highest intensity. The fluorescence light has its highest intensity when the intensity minimum not only in the center of the measurement area but also outside the center, and in an ideal case over its entire linear extension, coincides with the structure marked with the fluorescence markers. Even branchings of the structure are notified in this embodiment of the present invention because they result in several angle positions of the intensity minimum in which the fluorescence light has higher intensities as compared to other angle positions of the intensity minimum.

In order to achieve an as equal as possible spatial resolution in all spatial directions in imaging the structure of interest in the sample, the several angle positions of the intensity minimum are uniformly distributed over a full circle or a full solid angle about the center. Each point of a circular measurement area is at least once hit by a line-shaped intensity minimum whose minimal extension is by a factor k smaller than die diameter of the measurement area, if the line-shaped intensity minimum is oriented in at least $\pi k/2$ uniformly distributed angle positions about the center of the measurement area. According to this aspect, the number of the uniformly distributed angle positions does not need to be higher than $\pi k/2+1$. Generally, however, a uniform distribution of the several angle positions of the intensity minimum is not compulsory in the method according to the present invention of multi-dimensional high-resolution imaging.

The number of the several angle positions of the intensity minimum about the center of each measurement area is at least 2 with line-shaped intensity minimums and at least 3 with plane-shaped intensity minimums. As long as the number of the angle positions remains smaller than the factor k, particularly smaller than k/2, the method according to the present invention has a relevant capability of accelerating the scanning at a same spacing as significant amounts of fluorescence light are obtained faster for each angle position of the intensity minimum in the measurement area than with a one-dimensional or point shape intensity minimum. This is due to the fact that with a factor k the fluorescence light which is emitted by a two-dimensional sample out of the area of the intensity minimum, in the average, is reduced to $1/k^2$ with a point-shaped intensity minimum, whereas it is only reduced to $1/k$ with a line-shaped intensity minimum. Thus, the same amount of fluorescence light is measured with a line-shaped intensity minimum in a period of time reduced to $1/k$. If this is done for not more than k/2 different angle positions of the intensity minimum, the entire measurement period is still reduced to a half or even less as compared to that measurement period needed to measure a significant amount of fluorescence light with a point-shaped intensity minimum. A significant or meaningful amount of fluorescence light particularly is such an amount of fluorescence light which significantly goes beyond the noise of the detector used for measuring the fluorescence light and thus allows for a conclusion on the existence of fluorescence markers within the respective intensity minimum.

During measuring the fluorescence light, the angle of the intensity minimum about the center of the measurement area may not only discontinuously but also continuously be varied. With a continuous angle variation, a significant amount of fluorescence light may only once be measured for the entirety of the angle positions of the intensity minimum and thus within a period of time reduced to 1/k. If, on the other hand, an effective number of angle positions of the intensity minimum for which a significant amount of fluorescence light is measured exceeds k, the velocity advantage gets lost, but in this case additional information about the structure of interest in all spatial directions is included in the measured fluorescence light. In fact, the method according to the present invention achieves a certain spatial resolution in all spatial directions always with less fluorescence inhibiting light as compared to a point-shaped intensity minimum which is delimited by the fluorescence inhibiting light in all these spatial directions.

Even if the number of angle positions of the intensity minimum about the center of the measurement area, for which a significant amount of fluorescence light is measured each, reaches k or πk/2, the method according to the present invention reduces the danger of bleaching the fluorescence markers by which the structure of interest is marked. At each point in time, the sample is only subjected to half the light power in the measurement area as compared to a method using a point-shaped intensity minimum for achieving the same spatial resolution. Further, the areas of the highest intensity of the fluorescence inhibiting light in the measurement area are not distributed in a ring- or hollow sphere-shaped way over the entire circumference of the measurement area but they are concentrated to border areas of the measurement area at a distance to the intensity minimum, and with the several different angle positions of the intensity minimum the parts of the measurement area subjected to these intensities are varied. The resulting reduction of the danger of bleaching the fluorescence markers does not get lost in the method according to the present invention, even if each measurement area is measured for a longer period of time than with a point-shaped intensity minimum.

As the method according to the present invention achieves a spatial resolution with the minimum dimensions of the intensity minimum across the center of the measurement area, the sample is to be scanned with the measurement area at a spacing fitting to this high spatial resolution. Particularly, the spacing should be smaller than the minimal extension of the intensity minimum in each spatial direction in which the high spatial resolution shall be achieved. The highest spatial resolution is achieved, if the spacing is only half as large as the minimal extension of the intensity minimum. With an even smaller spacing the spatial resolution is not enhanced further.

To stress the fluorescence markers in the sample as little as possible, i.e. to minimize the danger of bleaching the fluorescence markers, the steps of subjecting and measuring may purposefully be repeated for non-overlapping measurement areas. This means that after executing the steps of the method according to the present invention for one measurement area, no directly neighboring measurement area which will be measured for scanning the sample will be measured but a measurement area which is at least one diameter of the measurement area away. If nevertheless directly neighboring measurement areas are measured in direct consecution, they may be arranged in the direction of one of the angle positions of the intensity minimum, because the fluorescence markers arranged in this direction in the sample are stressed to the lowest extent by the fluorescence inhibiting light.

If an image of the sample made up of added up intensities sums of the fluorescence light, i.e. a spatial distribution of these intensity sums, is high pass filtered with regard included spatial frequencies, those parts of the intensity sums are removed from the image which may be regarded as a confocal background, which may, however, also include signals from larger structures of the sample. In this way, the high pass filtered image concentrates on fine details of the structure of interest which are imaged at the desired high spatial resolution. Vice versa, low pass filtering of the primary image of the structure, i.e. a removal of high spatial frequencies, results in an equivalent to a confocal image of the structure, i.e. an image having a spatial resolution of the dimensions of the measurement area.

The method according to the present invention for multi-dimensional high-resolution imaging a path of a particle in a sample, the particle being marked with a fluorescence marker, comprises the following steps which are repeated for a plurality of measurement areas within the sample.

The measurement area is subjected to fluorescence enabling light. A partial area of the measurement area is subjected to fluorescence inhibiting light, wherein the partial area avoids a center of the measurement area in which an intensity distribution of the fluorescence inhibiting light has a line-shaped or plane-shaped intensity minimum extending across the center of the measurement area.

Fluorescence light emitted from the sample out of the measurement area is measured for several consecutive angle positions of the intensity minimum about the center with temporal resolution, wherein the temporal resolution resolves the consecutive angle positions of the intensity minimum with regard to the measured fluorescence light and wherein for each of the angle positions of the intensity minimum the measurement area is subjected to the fluorescence inhibiting light.

In that the measurement area is guided in the sample in such a way that a temporal intensity course of the fluorescence light measured over the several angle positions of the intensity minimum maintains predetermined course, the particle in the sample marked with the fluorescence marker is tracked at a fixed spatial offset between the center of the measurement area and the fluorescence marker. Considering this offset, the path of the particle in the sample is exactly imaged. The spatial resolution achieved here depends on how much smaller a minimal extension of the intensity minimum in a direction through the center of the measurement area is than a diameter of the measurement area in the same direction. In the method according to the present invention, the factor by which the minimal extension of the intensity minimum is smaller than the diameter of the measurement area in the same direction is at least 2, often at least 5; it may also even be 10 or more.

In this tracking method according to the present invention, depending on the selected offset, the number of the several angle positions of the intensity minimum for which the fluorescence light emitted out of the measurement area is consecutively measured is to be selected so high that the particle is hit by the intensity minimum in at least two angle positions so that not only the angle position of the particle with regard to the center but also the distance of the particle to the center of the measurement area can be determined. Preferably, the angle position of the intensity minimum about the center of the measurement area is continuously varied while measuring the fluorescence light emitted out of the measurement area at the temporal resolution.

In both methods according to the present invention, the fluorescence light emitted from the sample out of the measurement area may be measured with a point detector. Preferably, the point detector is arranged confocally with regard to the measurement area. This implies that, in both methods according to the present invention, the measurement area is circular.

In another preferred embodiment of both methods according to the present invention, particularly, however, in another preferred embodiment of the method for high-resolution imaging, the fluorescence light emitted from the sample out of the measurement area is confocally measured with a sensor array in a same way as known from ISM. Then, the evaluation of the fluorescence light measured with the sensor array may also take place according to the principles of ISM. Here, in the direction which is at present not influenced by the fluorescence inhibiting light, i.e. in the direction in which the line-shaped intensity minimum extends in its actual angle position, the spatial resolution is increased by a factor of 2 as compared to a simple confocal resolution. As this increase in spatial resolution is achieved in all of the different angle positions of the intensity minimum, it results in a corresponding increase in spatial resolution in all spatial directions.

A scanning fluorescence light microscope according to the present invention for multi-dimensional high-resolution imaging a structure marked with fluorescence markers comprises a fluorescence enabling light source providing fluorescence enabling light for subjecting a measurement area to the fluorescence enabling light, and a fluorescence inhibiting light source providing fluorescence inhibiting light for subjecting a partial area of the measurement area to the fluorescence inhibiting light. The partial area omits the center of the measurement area in that the intensity distribution of the fluorescence inhibiting light comprises a line-shaped or a plane-shaped intensity minimum extending across the center of the measurement area, wherein the minimal extension of the intensity minimum in a direction through the center of the measurement area is by a factor $k \geq 2$ smaller than the diameter of the measurement area in the same direction. Further, the fluorescence inhibiting light source has an angle adjusting device which is configured to adjust several consecutive angle positions of the intensity minimum about the center of the measurement area, wherein the fluorescence enabling light source is configured to subject the measurement area for each of the angle positions of the intensity minimum to the fluorescence enabling light. A detector of the scanning fluorescence light microscope is configured to measure the fluorescence light emitted from the sample out of the measurement area without spatial resolution within the measurement area for the several consecutive angle positions of the intensity minimum about the center of the measurement area and to add at least a part of the fluorescence light emitted out of the measurement area over the several angle positions up to generate an intensity sum. A coding device is configured to assign the intensity sum to a location defined in the sample by the position of the center of the measurement area. A scanning device is configured to scan a spatial area of the sample of interest with the center of the measurement area. Those skilled in the art will be able to construct the individual components of the scanning fluorescence light microscope according to the present invention due to their function described here based on the state of the art of present scanning fluorescence light microscopes without any problem.

The detector may be configured to add the entire fluorescence light emitted out of the measurement area over the several angle positions of the intensity minimum up to generate the intensity sum. Alternatively, it may be configured to only add up the constant part of the fluorescence light emitted out of the measurement area which remains constant over the several angle positions of the intensity minimum to generate the intensity sum.

Preferably, the detector is configured to measure the fluorescence light emitted from the sample out of the measurement area at a temporal resolution which allows for assigning the presently measured fluorescence light to the present angle position of the intensity minimum. Then, the scanning device may have a tracking mode in which it selectively arranges the measurement areas in a series in a direction of the angle positions of the intensity minimum in which the fluorescence light has its highest intensities. Angle positions of the intensity minimum with lower intensities indicate that no areas of the structure marked with the fluorescence markers are directly neighboring to the center of the present measurement area in their direction.

A scanning fluorescence light microscope for executing the method of multi-dimensional high-resolution imaging a path of a particle in a sample, the particle being marked with a fluorescence marker, also has a fluorescence enabling light source providing fluorescence enabling light for subjecting the measurement area to the fluorescence enabling light, and a fluorescence inhibiting light source providing fluorescence inhibiting light for subjecting the partial area of the measurement area to the fluorescence inhibiting light, wherein the partial area leaves out or omits the center of the measurement area in that the intensity distribution of the fluorescence inhibiting light has the line-shaped or plane-shaped intensity minimum extending across the center of the measurement area, wherein the minimal extension of the intensity minimum in a direction through the center of the measurement area is by a factor $k \geq 2$ smaller than the extension of the measurement area in the same direction. Further, also in this scanning fluorescence light microscope, an angle adjusting device of the fluorescence inhibiting light source is configured to adjust the several consecutive angle positions of the intensity minimum about the center of the measurement area, wherein the fluorescence enabling light source is configured to subject the measurement area to the fluorescence enabling light for each of these angle positions of the intensity minimum. A detector of this scanning fluorescence light microscope according to the present invention is configured to measure the fluorescence light emitted from the sample out of the measurement area without spatial resolution within the measurement area but with temporal resolution with regard to the several consecutive angle positions of the intensity minimum about the center of the measurement area. Based on this measurement, a tracking device tracks the particle in the sample with the measurement area in that it keeps the temporal intensity course of the fluorescence light measured over the several angle positions of the line-shaped or plane-shaped intensity minimum at the predetermined course.

In both scanning fluorescence light microscopes according to the present invention, the angle adjusting device may be configured to distribute the several angle positions of the intensity minimum uniformly over a full circle or solid angle about the center of the measurement area. Further, the angle adjusting device may be configured to vary the angle of the intensity minimum about the center of the measurement area continuously or in discrete steps.

Particularly, the angle adjusting device may comprise a wavefront modulator and at least one Pockels cell rotating a polarization direction of the fluorescence inhibiting light. The Pockels cell is arranged downstream of the wavefront modulator to rotate the polarization direction of the light exiting the wavefront modulator in such a way that it runs along a phase step of λ/2 which splits up the wavefronts in halves along a straight line. This is a precondition for forming a line-shaped intensity minimum—or a plane-shaped intensity minimum when considering all three spatial directions—which is delimited by two intensity maxima when focusing the fluorescence inhibiting light afterwards. The wavefront modulator may be a so-called spatial light modulator. A wavefront modulator comprising a biaxial crystal with at least one input side and at least one output side Pockels cell may also be used. By means of each Pockels cell, the polarization direction of linearly polarized light may generally be adjusted as desired when combined with a λ/4 plate. A high degree of freedom in adjusting the polarization direction by means of Pockels cells is achieved if two Pockels cells are connected in series and arranged at an angle of 45° with regard to each other. Then no additional λ/4 plate is needed. Instead of such a combination of two Pockels cells or a Pockels cell with a fixed λ/4 plate, a λ/2 plate may be used for adjusting the polarization direction. This λ/2 plate, however, has to be rotatable about the beam axis. Here, its rotation frequency has to be at least as high as the scanning rate at which the sample is scanned with the measurement area. A wavefront modulator with a biaxial crystal in combination with Pockels cells is generally known from biaxial scanning fluorescence light microscopy.

As an alternative with regard to a wavefront modulator by which the wavefronts may be modulated voluntarily, the angle adjusting device may comprise at least two partial light beams for the fluorescence inhibiting light which are each configured to adjust one of the several angle positions of the intensity minimum. For example, a phase plate may be arranged in each of these partial light beams which delays half of the wavefront along a suitable line with regard to the other half of the wavefront by λ/2. Then, the fluorescence inhibiting light may be coupled in the different partial light beams one after the other, or the different partial light beams are adjusted by optical delays in such a way that the fluorescence inhibiting light displays the different angle positions of the intensity minimum in the sample one after the other, wherein the sample is subjected to the fluorescence enabling light for each of the angle positions of the intensity minimum.

Both embodiments of the scanning fluorescence light microscope according to the present invention may have a point detector as the only light-sensitive element for measuring the fluorescence light. Instead of such a confocally arranged point detector, a confocally arranged sensor array may be provided. In principle, the fluorescence light emitted out of the sample may also be measured with a confocally arranged camera. With a measurement area of diffraction-limited dimensions, such a camera, however, does not spatially resolve the measurement area in measuring the fluorescence light.

There are further opportunities with regard to evaluating the fluorescence light which, in the method according to the present invention or with the scanning fluorescence light microscope according to the present invention, has been measured and assigned to the respective positions of the center of the measurement area in the sample in addition to the already indicated opportunities.

The most direct method of reconstructing the structure marked with the fluorescence markers consists of generating the already mentioned intensity sum, i.e. of adding the measured fluorescence light up over the different angle positions of the line-shaped intensity minimum. This adding up or integrating may be executed in the position space or in the frequency space, and it is possible without knowing the Point Spread Functions (PSFs). However, this method provides a confocal shade or corona in the PSF due to excessively weighting low frequencies. Consequently, it sets a lower margin with regard to the obtainable spatial resolution.

The spatial resolution obtainable with the intensity sum may be increased by additional measures. For example, its summands in the frequency space may be weighted. For this method, the Optical Transfer Function (OTF) of the intensity sum has to be considered. Then, the above described overweights of lower frequencies are suppressed by means of a suitable weighting function. This omits the confocal shade or corona in the images of the structure of interest. To execute this method, at least a coarse knowledge of the PSFs is necessary.

Both in the frequency space and in the position space, other reconstruction methods may also be applied, like for example the average, maximum or minimum method. Corresponding mathematical algorithms are described for the multifocal-confocal microscopy by R. Heintzmann and P. A. Benedetti: High-resolution image reconstruction in fluorescence microscopy with patterned excitation, Appl. Opt., OSA, 2006, 45, 5037-5045.

In the maximum value method in the frequency space, each individual image taken in the position space having a one-dimensional increase of spatial resolution due to a line-shaped intensity minimum with a fixed angle position is subjected to a Fourier transformation. The resulting OTFs each show an increase of resolution along the direction orthogonal to the intensity minimum. Afterwards, the OTF providing the maximum contribution for this frequency is determined for each frequency vector. This maximum contribution is added for this frequency to the reconstructed OTF. An inverse Fourier transformation provides an image in the position space with two-dimensional increase in spatial resolution. It is a drawback, however, that signal is lost as always only the maximum contributions are considered. On the other hand, it is an advantage that no knowledge is needed with regard to the PSFs.

In the minimum value method in the position space, the data of the different angle positions of the intensity minimum in the position space are simultaneously evaluated. For each position vector, the contribution of that angle position is kept which provides the minimum contribution. Thus, only the constant part of the data is considered. The advantages and disadvantages are similar to those of the maximum value method.

In a further method, the structure of interest is reconstructed by means of an iteration algorithm. The object is approximated by means of a Richardson Lucy deconvolution. This approximation which is based on the maximum likelihood method is carried out for images with different angle positions of the line-shaped intensity minimum. Afterwards, the individual approximations are averaged. It is a drawback of this method that the PSFs have to be known at least coarsely. The big advantage is that the entire signal is used. Guidelines for executing this method are found in W. H. Richardson: Bayesian-Based Iterative Method of Image Restoration, JOSA 62 (1): 55-59, 1972, and in L. B. Lucy and R. N. Hook: Co-Adding Images with different PSF's, Astronomical Soc Pac, 1992.

If the fluorescence light out of the measurement area is measured by means of a sensor array, it is further possible to combine the reconstruction method with the re-scan method or the ISM as inter alia described by Stephan Roth et al. As compared to the common 2D STED microscopy, the method according to the present invention in each measurement of the fluorescence light emitted out of the measurement area has a confocal axis. Along this confocal direction, the area within which the spatial frequencies are not zero may be expanded according to the re-scan method by a factor of about 2. By means of this reconstruction, additional information and thus a higher spatial resolution is obtained. For the re-scan method, see Stephan Roth, Colin J R Sheppard, Kai Wicker and Rainer Heintzmann: Optical photon reassignment microscopy (OPRA); Optical Nanoscopy 2013, 2:5; and for ISM see Claus B. Müller and Jörg Enderlein: Image Scanning Microscopy. Physical Review Letters, Vol. 104, 198101 (2010).

Referring now in greater detail to the drawings, FIG. 1 strongly schematically depicts a scanning fluorescence light microscope 1. The scanning fluorescence light microscope 1 comprises a fluorescence enabling light source 2 implemented as a pulsed laser providing fluorescence enabling light 3 in pulses. The fluorescence enabling light 3 excites fluorescence markers by which a structure of interest is marked in a sample 4 for emission of fluorescence light 7. The fluorescence enabling light 3 is focused into the sample 4 by means of an objective lens 5. The area illuminated by the fluorescence enabling light 3 in the sample 4 has minimal dimensions determined by the diffraction limit at the wavelength of the fluorescence enabling light 3. This illuminated area is also designated as measurement area here. A detector 6 is provided to measure the fluorescence light 7 emitted from the sample out of the measurement area. The detector 6 is a point detector. By means of a pinhole 8, the point detector is confocally arranged with regard to a focus point of the objective lens 5, around which the measurement area extends. The detector 6 measures the fluorescence light emitted out of the measurement area without spatial resolution within the measurement area. An additional fluorescence inhibiting light source 9 is provided to direct fluorescence inhibiting light 10 onto the sample 4. The fluorescence inhibiting light 10 de-excites fluorescence markers which have been excited by the fluorescence enabling light 3 and which are located in a partial area of the measurement area so that these fluorescence markers cannot contribute to the fluorescence light measured by the detector 6. Particularly, the fluorescence inhibiting light 10 de-excites the excited fluorescence markers in this partial area of the measurement area by means of stimulated emission. The partial area of the measurement area in which this de-excitation takes place omits a line-shaped intensity minimum of the fluorescence inhibiting light 10 which is formed and successively oriented in different angle positions about a center of the measurement area by means of an angle adjusting device 11 of the fluorescence inhibiting light source 9. The fluorescence inhibiting light 10 is provided by a pulsed laser 12. A scanning device 13, which may be a so-called beam scanner, scans the sample 4 with the measurement area in small steps or spacing of half of the minimum dimensions of the line-shaped intensity minimum across the center of the measurement area. For each measurement area, i.e. for each position of the center of the measurement area in the sample 4, the detector 6 measures the fluorescence light 7 for the different angle positions of the line-shaped intensity minimum adjusted by means of the angle adjusting device 11, while the sample 4 is subjected to fluorescence enabling light 3 from the fluorescence enabling light source 2 in each of the angle positions. A controller 14 is provided for coordinating the fluorescence enabling light source 2, the pulse laser 12 and the angle adjusting device 11 of the fluorescence inhibiting light source 9, the detector 6 as well as the scanning device 13. The controller controls these devices via control and trigger signals 15. In this way, an output signal 16 of the detector 6 forwarded to a data storage 17 which also receives a control signal 15 from the controller 14 is stored in such a way that it is assigned to the associated position of the center of the measurement area within the sample 4. This may be implemented by means of a certain storage place or a code for the position of the center of the measurement area which is stored together with the output signal 16. The output signal 16 of the detector 6 additionally includes an intensity sum, here, which the detector 6 adds up over several angle positions of the intensity minimum about the fixed center of the measurement area. To generate this intensity sum, the entire fluorescence light 7 emitted out of the measurement area may be added up. Alternatively, only a part of this fluorescence light 7 is added up, like for example its constant part which does not vary over the different angle positions of the line-shaped intensity minimum and which may thus be stronger related to the center of the measurement area than a variable part of the fluorescence light 7, for example.

Figure 2:
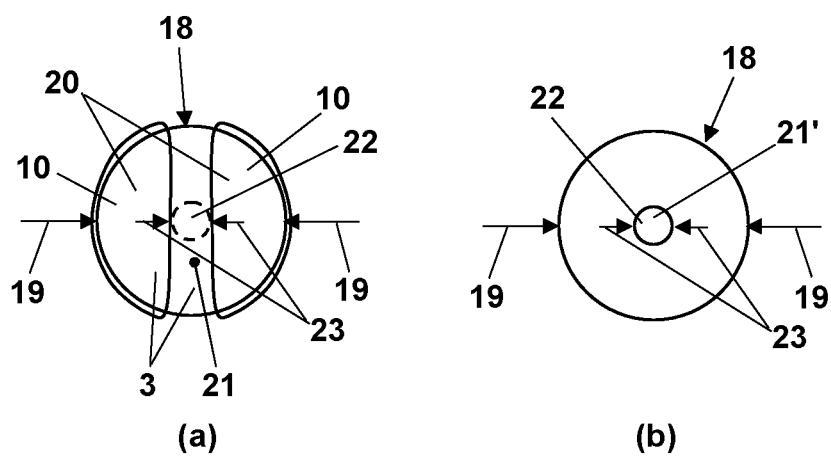
FIG. 2 shows a line-shaped intensity minimum formed by the scanning fluorescence light microscope according to FIG. 1 in a measurement area (a) in comparison to a point-shaped intensity minimum in the measurement area (b).

FIG. 2 (a) illustrates a circular measurement area 18 of the scanning fluorescence light microscope 1 according to FIG. 1. The measurement area 18 has a diameter 19. Over the entire measurement area 18, the sample 4 according to FIG. 1 is subjected to the fluorescence enabling light 3 from the fluorescence enabling light source 2. A split partial area 20 of the measurement area 18 in which the measurement area 18 is subjected to the fluorescence inhibiting light 10 from the fluorescence inhibiting light source 9, however, omits the line-shaped intensity minimum 21 which extends across the center 22 of the measurement area 18. The minimum dimension 23 of the intensity minimum in a direction crossing the center 22 is depicted in the present example such that it corresponds to $1/5$ of the diameter 19 of the measurement area 18 in the same direction. By means of the fluorescence inhibiting light 10, the effective measurement area is thus reduced to $1/5$ of its diffraction-limited dimensions in one direction. Consequently, the intensity of the fluorescence light 7 still obtained out of the measurement area 18 which may only stem from the intensity minimum 21 is also reduced to about $1/5$.

For comparison purposes, FIG. 2 (b) shows a point-shaped intensity minimum 21' having the same minimum dimension 23 in a direction across the center 22 with regard to the diameter 19. This means, the ratio between the dimension 23 and the diameter 19 is 1:5 here, too. Due to the point-shaped intensity minimum 21', the effective measurement area 18 is delimited in two dimensions, and the intensity of the fluorescence light 7 still obtainable from the measurement area 18 has an intensity reduced to about $1/k^2$. This means that for measuring a significant amount of fluorescence light out of the intensity minimum 21' k times the time is needed which is needed for measuring a significant amount of fluorescence light out of the intensity minimum 21 according to FIG. 2 (a). This speed advantage of the line-shaped intensity minimum 21 remains, even if different angle positions of the intensity minimum 21 according to FIG. 2 (a) are adjusted at each position of the center of the measurement area, as long as the number of these angle positions of the intensity minimum 21 remains significantly smaller than k. Additionally, the light power of the fluorescence inhibiting light 10 for forming the intensity minimum 21 according to FIG. 2 (a) is only half as high as the light power required for forming the intensity minimum 21' according to FIG. 2 (b). This means that the pulsed laser 12 according to FIG. 1 may be of a lower power and thus cheaper, or that, with the same pulsed laser 12, a higher factor k, i.e. a higher spatial resolution, can be achieved. The lower light power for the same factor k also means that the danger of bleaching the fluorescence markers due to the light intensities directed into the measurement area 18 is reduced.

Figure 3:
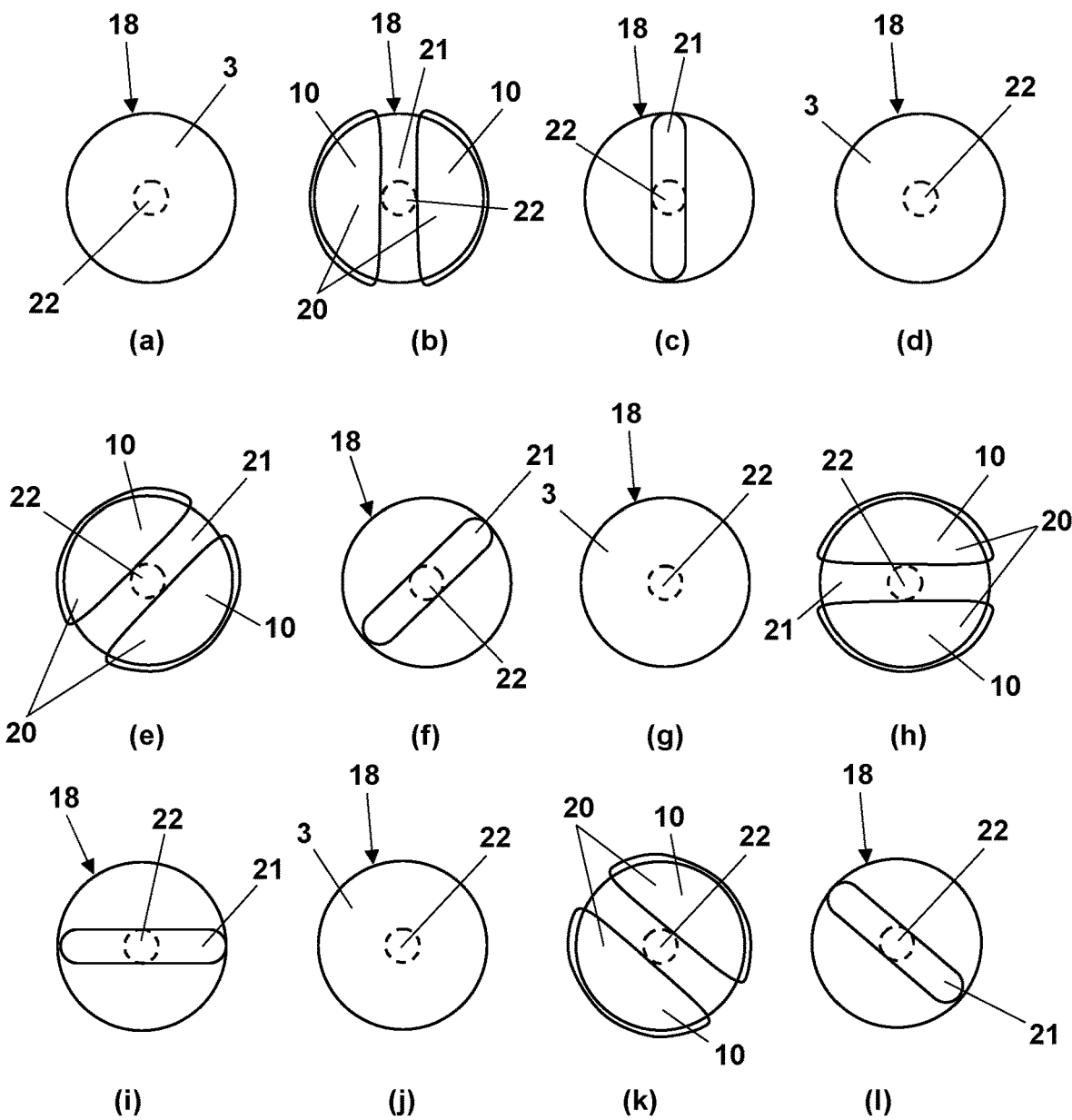
FIG. 3 illustrates measuring a measurement area with the scanning fluorescence light microscope of FIG. 1 with regard to the different angle positions of the intensity minimum according to FIG. 2 (a).

FIG. 3 illustrates a sequence of steps which are executed for one measurement area 18 in the scanning fluorescence light microscope 1 according to FIG. 1 prior to heading for another measurement area by means of the scanning device 13. In step (a) the measurement area 18 is subjected to the fluorescence enabling light 3. In step (b) the measurement area 18 is then subjected to the fluorescence inhibiting light 10 in the partial area 20 which omits the line-shaped intensity minimum 21. In step (c) the fluorescence light emitted out of the intensity minimum 21 is measured by means of the detector 6. The steps (d), (e) and (f) correspond to the steps (a), (b) and (c) for another angle position of the intensity minimum 21, which is offset at an angle of 45° with regard to the angle position of the intensity minimum 21 in the steps (b) and (c). The same applies for the steps (g) to (i) and (j) to (I), wherein the intensity minimum 21 is each rotated by further 45° about the center 22. Over all steps (a) to (I), the circle about the intensity minimum 21 is uniformly covered by four angle positions of the intensity minimum 21. For each of the angle positions of the intensity minimum 21 a significant amount of fluorescence light from the sample may be measured. Then, evaluations of the fluorescence light for the individual angle positions of the intensity minimum 21 are possible. Alternatively, only one significant amount of fluorescence light is measured over all angle positions of the intensity minimum 21. Then, no individual evaluation is possible. However, a maximum acceleration in measuring the fluorescence light out of the measurement area 18 is achieved.

Figure 4:
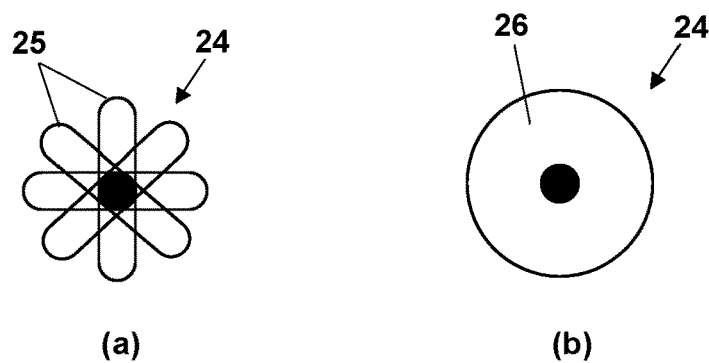
FIG. 4 shows an image of a single fluorescence marker taken with the scanning fluorescence light microscope according to FIG. 1 with adjusting a plurality of discrete angle positions (a) and with continuously rotation (b) of the intensity minimum according to FIG. 2 (a).

FIG. 4 (*a*) shows an image 24 of an individual fluorescence marker generated from the intensity sums of the fluorescence light 7 emitted out of the sample 4 added up for each position of the measurement area 18 when scanning the sample 4 including the fluorescence marker with the center of the measurement area 18. Due to the line-shaped extension of the intensity minimum 21, the fluorescence light 7 from the fluorescence marker is not only measured for the measurement area 18 whose center 22 hits the fluorescence marker but also for neighboring measurement areas. Tails 25 of the image 24 of the fluorescence marker reflect the orientation and extension of the intensity minimum 21 within the measurement area 18.

For comparison purposes, FIG. 4 (*b*) shows the image 24 of a fluorescence marker which has been taken with the scanning fluorescence light microscope 1 according to FIG. 1 with continuously varying the angle position of the intensity minimum 21 for each measurement area 18. Here, a corona 26 is evenly distributed without any preferred spatial direction around that point at which the measurement area hits the fluorescence marker with its center 22.

Figure 5:
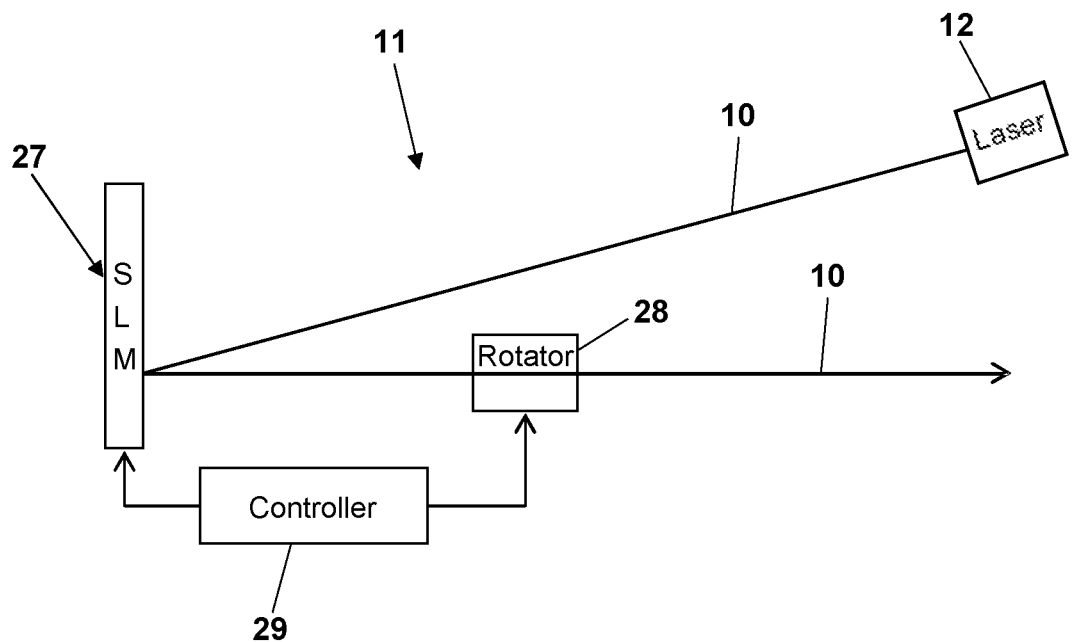
FIG. 5 shows a first embodiment of an angle adjusting device of the scanning fluorescence light microscope according to FIG. 1 comprising a Spatial Light Modulator (SLM).

FIG. 5 illustrates an embodiment of the angle adjusting device 11 comprising a Spatial Light Modulator (SLM) 27. Linearly polarized fluorescence inhibiting light 10 enters the SLM. The SLM modulates the phase fronts of the fluorescence inhibiting light 10 in such a way that they are delayed by λ/2 on one side of the optical axis with regard to the other, λ being the wavelength of the fluorescence inhibiting light. A rotation device 28 afterwards rotates the polarization direction of the fluorescence inhibiting light 10 such that it is parallel to the phase step, i.e. the border between the two partial areas of the wavefronts which are delayed by λ/2 with regard to each other. This is a precondition for forming the line-shaped intensity minimum 21 when the fluorescence inhibiting light 10 is afterwards focused by means of the objective 5. A controller 29 controls the SLM 25 and the rotation device 28 in a coordinated way.

Figure 6:
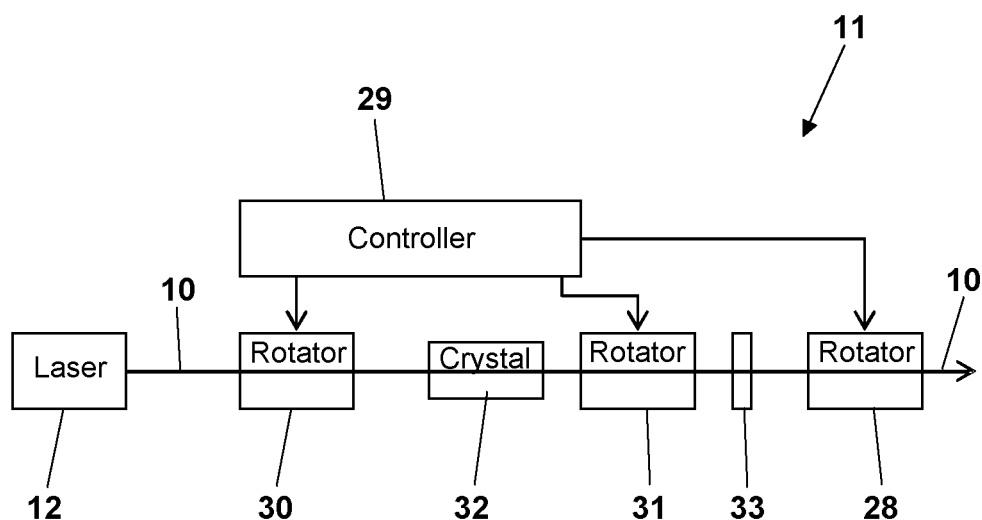
FIG. 6 schematically shows a second embodiment of the angle adjusting device comprising a biaxial crystal.

In the embodiment of the angle adjusting device 11 according to FIG. 6, further rotation devices 31 and 31 are provided. The first rotation device 30 rotates the polarization direction of the incoming linearly polarized fluorescence inhibiting light 10 in such a way that a biaxial crystal 32 making use of the so-called conical diffraction in combination with a further rotation device 31 and an analyzer 33 modulates the wavefronts in such a way that the line-shaped intensity minimum 21 is formed with the respective desired angle position. Afterwards, the rotation device 28 rotates the polarization direction of the fluorescence inhibiting light 10 in such a way that the intensity minimum 21 is formed with the desired angle position when focusing the fluorescence inhibiting light 10.

Figure 7:
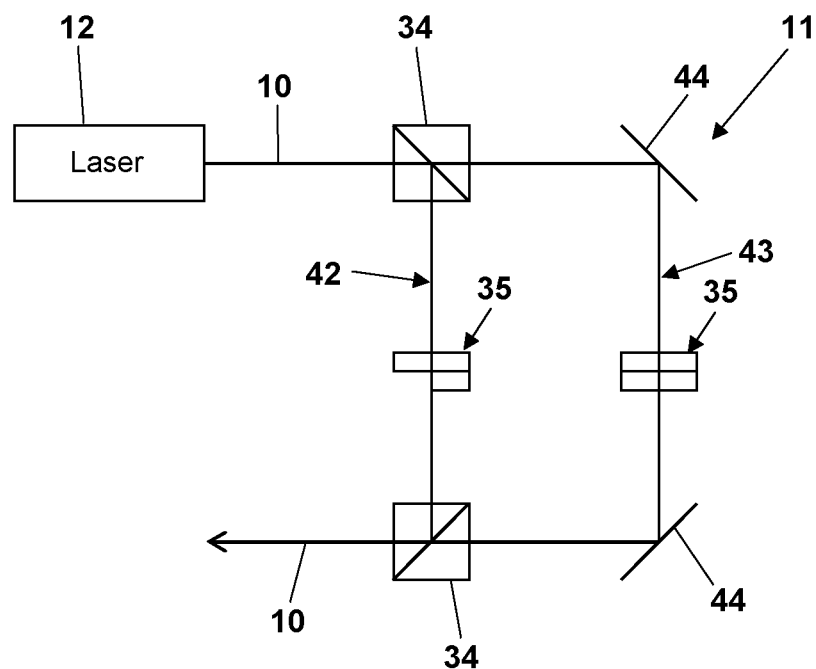
FIG. 7 schematically shows a further embodiment of the angle adjusting device comprising two section-wise separated partial light paths for fluorescence inhibiting light.

In the embodiment of the angle adjusting device 11 according to FIG. 7, the incoming fluorescence inhibiting light 10 is split up in two partial beams on different partial light paths 42, 43 by means of a polarization beam splitter 34. In the partial light paths 42 and 43 same phase plates 35 are arranged but at different orientations about the beam axis. The two partial beams are then recombined by a further polarization beam splitter 34. The partial light paths 42 and 43 of the partial beams are of different length so that the fluorescence inhibiting light 10 proceeding along the longer partial light path 43 is delayed by half the reciprocal value of the pulse frequency of the pulsed laser 12 with regard to the fluorescence inhibiting light 10 proceeding along the shorter partial light path 42. For this purpose, an optical delay which is not depicted here may be arranged in the partial light path 43. The fluorescence inhibiting light 10 emerging out of the angle adjusting device 11 thus has twice the pulse frequency as compared to the incoming fluorescence inhibiting light 10, and the emerging fluorescence inhibiting light 10 consists of pulses which alternatingly form the intensity minimum 21 with angle positions offset by 90° about the center of the measurement area. For providing all four angle positions according to FIG. 3, the incoming fluorescence inhibiting light 10 has to be split up into four partial beams. As an alternative to splitting up the fluorescence inhibiting light 10 provided by only one pulsed laser 12, a plurality of synchronized pulsed lasers 12 may be used. The embodiment of the angle adjusting device 11 according to FIG. 7 does not need any rotation device 28.

Figure 8:
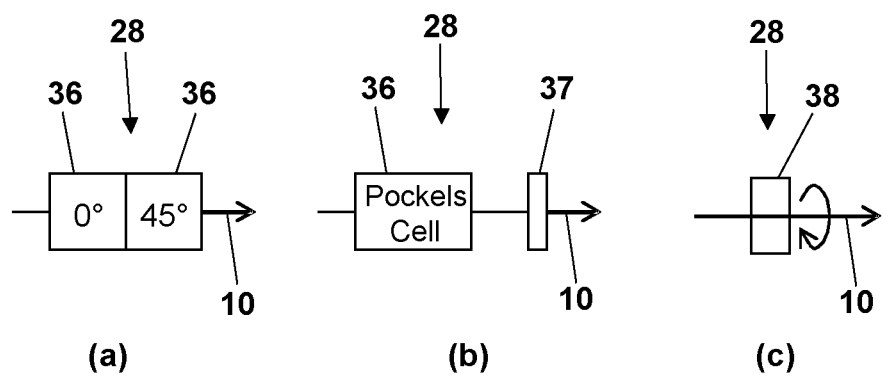
FIG. 8 shows three different embodiments of a polarization rotating device which is included in each of the embodiment of the angle adjusting device according to FIGS. 5 and 6.

FIG. 8 schematically shows different embodiments of a rotation device 28. The rotation devices 30 and 31 according to FIG. 6 may be implemented in the same way. According to FIG. 8 (*a*), the rotation device 28 consists of two Pockels cells 36 oriented at an angle of 45° with regard to each other. According to FIG. 8 (*b*), a Pockels cell 36 is combined with a fixed λ/4 plate 37. Generally, this is sufficient to rotate the polarization direction of incoming light in any desired direction. FIG. 8 (*c*) shows a rotating λ/2 plate 38 as the rotation device 28. The rotation angle of the λ/2 plate 38 about the optical axis has to be adjusted in such a way that the resulting rotation of the polarization direction is the desired polarization direction. In the embodiments of the rotation device 28 according to FIGS. 8 (*a*) and (*b*), the desired polarization direction is adjusted by controlling the Pockels cells 36.

Figure 9:
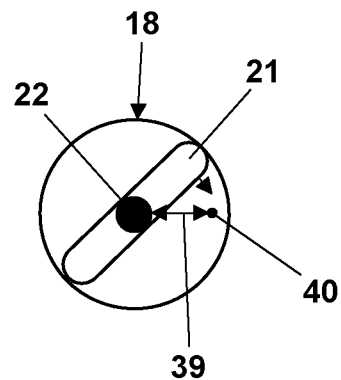
FIG. 9 illustrates a method according to the present invention for multi-dimensional high-resolution imaging a path of a particle in a sample, the particle being marked with a fluorescence marker.
Figure 10:
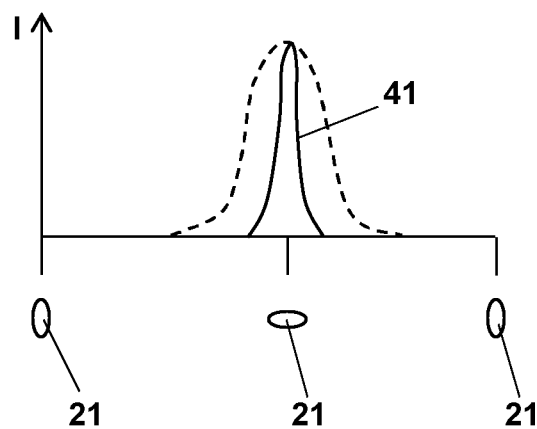
FIG. 10 is a diagram of an intensity course of fluorescence light in the method illustrated in FIG. 9.

FIG. 9 illustrates an offset 39 between a particle 40 marked with a fluorescence marker during tracking a path of the particle 40 in a sample according to the present invention. This offset 39 is present between the center 22 of the measurement area 18 and the particle 40 or its fluorescence marker. As long as this offset 39 remains constant, there is a desired course 41 of the intensity I of the fluorescence light emitted out of the measurement area 18 over the different angle positions of the intensity minimum 21, which is depicted in FIG. 10 with a solid line. When the offset 19 gets smaller, the intensity course 41 gets broader which is depicted in FIG. 10 with a dashed line. When the offset 19 increases, the intensity course 41 gets narrower. With a changing orientation of the offset 39, the phase position of the course 41 with regard to the angle positions of the intensity minimum 21 depicted in FIG. 10 also changes. In that the measurement area 18 is guided with the scanning device 13 according to FIG. 1 such that the intensity course 41 does not change with regard to its form and its phase position, the particle 40 is tracked with the center 22 at a high spatial resolution and at the offset 39.

Figure 11:
FIG. 11 illustrates an option to suppress the corona occurring with a continuously variation of the angle position of the line-shaped intensity minimum according to FIG. 4 (b).
Figure 11:
Figure 11:
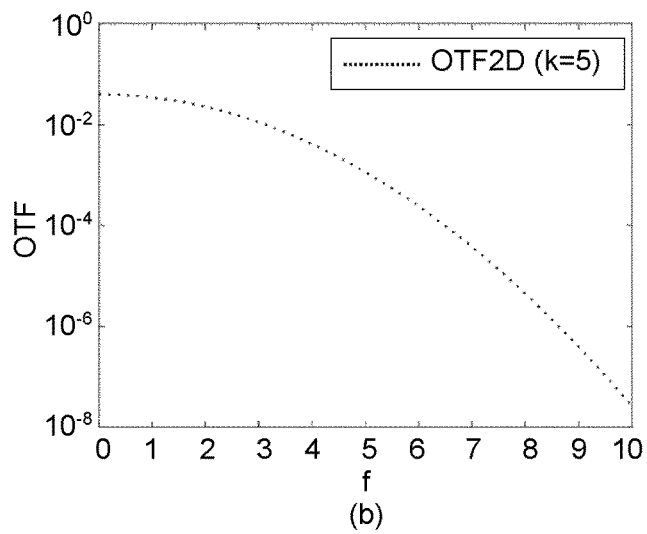
Figure 11:
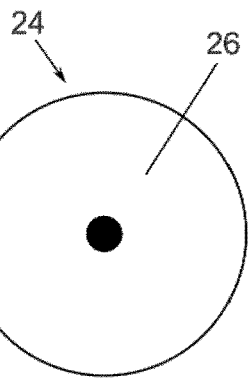
Figure 11:
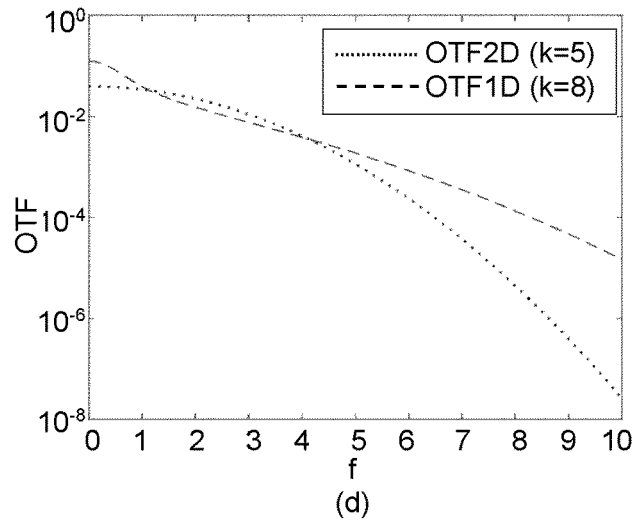
Figure 11:
Figure 11:
Figure 11:
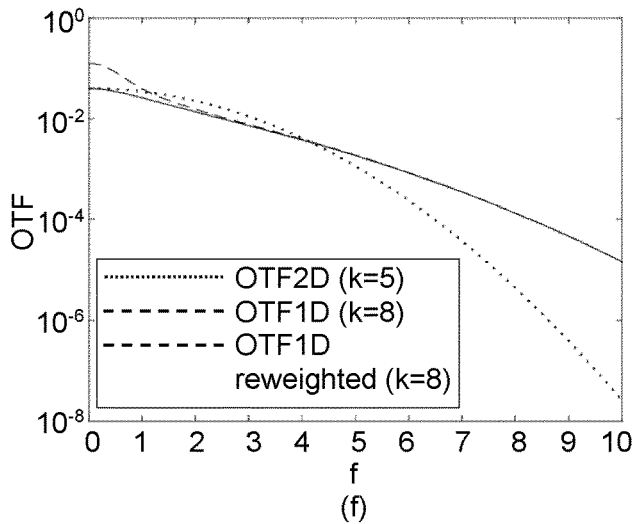

FIG. 11 (a) illustrates an image taken with a point-shaped intensity minimum of the intensity distribution of the fluorescence inhibiting light. Here, the factor of the increase in spatial resolution as compared to common confocal scanning fluorescence light microscopy is k=5. The radial decrease (along the space frequency) of the corresponding Optical Transfer Function (OTF) is depicted in FIG. 11 (b) as a dotted line and indicated as OTF2D (k=5).

FIG. 11 (c) schematically illustrates an image taken with the same light power in the same measurement period as in FIG. 11 (a), but with a rotating line-shaped intensity minimum. In this case, an individual measurement in the direction of the minimum dimension of the intensity minimum provides an image with a higher increase in spatial resolution of k=8 as compared to common confocal scanning fluorescence light microscopy. Generating the intensity sum of the individual measurements results in an also higher increased spatially resolved image in the center of the measurement area. However, the strong weighting of low frequencies results in a corona. The OTF resulting from the intensity sum is depicted in FIG. 11 (d) as a dashed line and indicated as OTF1D (k=8). The stronger weighting of the low frequencies in the area f<1 as compared to the image obtained using the point-shaped intensity minimum is obvious from a comparison to the dotted line (OTF2D (k=5)). Further, higher frequencies in the area f>4 are also transmitted to a higher extent in the method using the line-shaped intensity minimum. This leads to an increased signal and resolution advantage of the resulting image. Purposefully suppressing those frequencies which result in the formation of the corona provides an image without corona according to FIG. 11 (e). The corresponding weighting of the OTF is illustrated in FIG. 11 (f). The originally generated intensity sum (dashed line, OTF1D (k=8)) is aligned with a suitable weighting function (solid line, OTF1D reweighted (k=8)). Consequently, for lower frequencies in the area f<2, there is a signal transfer which at maximum corresponds to the method using the point-shaped intensity minimum (dotted line, OTF2D (k=5)). With regard to higher frequencies in the area f>2, the OTF of the intensity sum (OTF1D (k=8)) is not modulated, and the gain of signal and resolution described above is not compromised.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of multi-dimensional high-resolution imaging a structure of a sample, which is marked with fluorescence markers, the method comprising:
    focusing fluorescence enabling light into the sample, the focused fluorescence enabling light illuminating a measurement area in the sample;
    subjecting a partial area of the measurement area to fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is d/k, wherein k≥2, and wherein d is a diffraction-limited diameter of the measurement area in said direction;
    measuring fluorescence light emitted from the sample out of the measurement area without spatial resolution within the measurement area, wherein the fluorescence light emitted out of the measurement area is measured for a plurality of consecutive angle positions of the intensity minimum about the center at a temporal resolution, which resolves the plurality of consecutive angle positions of the intensity minimum in the measured fluorescence light, and wherein the measurement area, for each of the plurality of consecutive angle positions of the intensity minimum, is subjected to the fluorescence enabling light, and
    assigning a value of the measured fluorescence light to a location defined by the position of the center of the measurement area in the sample,
    wherein the steps of focusing, subjecting, measuring and assigning are repeated for each measurement area of a plurality of measurement areas in the sample.

2. The method of claim 1, wherein the fluorescence light emitted from the sample out of the measurement area is measured confocally with regard to the fluorescence enabling light focused into the sample.

3. The method of claim 2, wherein the fluorescence light is measured with a point detector or a sensor array which is confocally arranged with regard to the fluorescence enabling light focused into the sample.

4. The method of claim 1, wherein an intensity sum which is calculated by adding at least a part of the fluorescence light emitted out of the measurement area up over the plurality of consecutive angle positions of the intensity minimum is assigned as the value of the measured fluorescence light to the location defined by the position of the center of the measurement area in the sample.

5. The method of claim 4, wherein the intensity sum is calculated by adding the entire fluorescence light emitted out of the measurement area up over the plurality of consecutive angle positions.

6. The method of claim 5, wherein a primary image of the structure composed of the intensity sums which are calculated for the plurality of measurement areas is high-pass filtered with regard to spatial frequencies.

7. The method of claim 1, wherein a direct component of the fluorescence light emitted out of the measurement area is assigned as the value of the measured fluorescence light to the location defined by the position of the center of the measurement area in the sample.

8. The method of claim 1, wherein the measurement areas of the plurality of measurement areas are arranged along a direction of that angle positions of the intensity minima in which the fluorescence light displays its maximum intensities.

9. The method of claim 1, wherein the plurality of consecutive angle positions of the intensity minimum are uniformly distributed over a full circle or solid angle about the center of the measurement area.

10. The method of claim 1, wherein a number n of the angle positions of the intensity minimum fulfills at least one of the following conditions: $n \geq \pi k/2$ and $n \leq \pi k/2+1$.

11. The method of claim 1, wherein the angle position of the intensity minimum about the center of the measurement area is continuously varied while measuring the fluorescence light.

12. The method of claim 1, wherein the measurement areas of the plurality of measurement areas are arranged at a spacing of less than the minimal extension of the intensity minimum in two or three spatial dimensions.

13. The method of claim 1, wherein the steps of subjecting and measuring are directly repeated for measurement areas of the plurality of measurement areas which do not overlap.

14. A method of multi-dimensional high-resolution imaging a path of a particle in a sample, the particle being marked with a fluorescence marker, the method comprising:
focusing fluorescence enabling light into the sample, the focused fluorescence enabling light illuminating a measurement area in the sample;
subjecting a partial area of the measurement area to fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is d/k, wherein $k \geq 2$, and wherein d is a diffraction-limited diameter of the measurement area in said direction;
measuring fluorescence light emitted from the sample out of the measurement area without spatial resolution within the measurement area, wherein the fluorescence light emitted out of the measurement area is measured at a temporal resolution for a plurality of consecutive angle positions of the intensity minimum about the center, wherein the temporal resolution resolves the angle positions of the intensity minimum in the measured fluorescence light, and wherein the measurement area, for each angle position of the intensity minimum, is subjected to the fluorescence enabling light;
measuring the fluorescence light emitted from the sample out of the measurement area without spatial resolution with the measurement area, wherein the fluorescence light emitted out of the measurement area is measured with spatial resolution for a plurality of consecutive angle positions of the line-shaped or plane-shaped intensity minimum about the center, wherein the temporal resolution resolves the angle positions of the intensity minimum in the measured fluorescence light, and wherein the measurement area is subjected to the fluorescence enabling light for each of the angle positions of the intensity minimum; and
updating a position of the center of the measurement area in the sample such that a predetermined temporal course of intensities of the fluorescence light measured over the plurality of angle positions of the line-shaped or plane shaped intensity minimum is maintained;

wherein the steps of focusing, subjecting, measuring and updating are repeated for a plurality of measurement areas in the sample.

15. The method of claim 14, wherein the fluorescence light emitted from the sample out of the measurement area is measured confocally with regard to the fluorescence enabling light focused into the sample.

16. The method of claim 15, wherein the fluorescence light emitted from the sample out of the measurement area is measured with a point detector or a sensor array which is confocally arranged with regard to the fluorescence enabling light focused into the sample.

17. A scanning fluorescence light microscope for multi-dimensional high-resolution imaging a structure of a sample, which is marked with fluorescence markers, the scanning fluorescence light microscope comprising:
a fluorescence enabling light source providing fluorescence enabling light and configured to illuminate a measurement area in the sample with the focused fluorescence enabling light;
a fluorescence inhibiting light source providing fluorescence inhibiting light and configured to subject a partial area of the measurement area to the fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is d/k, wherein $k \geq 2$, and wherein d is a diffraction-limited diameter of the measurement area in said direction;
a detector configured to measure fluorescence light emitted from the sample out of the measurement area without spatial resolution within the measurement area;
a coding device configured to assign a value of the measured fluorescence light to a location defined by the position of the center of the measurement area in the sample; and
a scanning device configured to scan a spatial area of interest of the sample with the center of the measurement area,
wherein the fluorescence inhibiting light source has an angle adjusting device configured to adjust a plurality of consecutive angle positions of the intensity minimum about the center of the measurement area, wherein the fluorescence enabling light source is configured to subject the measurement area to the fluorescence enabling light for each of the plurality of consecutive angle positions of the intensity minimum, and
wherein the detector is configured to measure the fluorescence light emitted out of the measurement area for the plurality of consecutive angle positions of the intensity minimum about the center of the measurement area at a temporal resolution, which resolves the plurality of consecutive angle positions of the intensity minimum in the measured fluorescence light.

18. The scanning fluorescence light microscope of claim 17, wherein the detector comprises a point detector or a sensor array, the point detector or the sensor array being confocally arranged with regard to the measurement area and the only light-sensitive element of the detector.

19. The scanning fluorescence light microscope of claim 17, wherein the detector is configured to add at least a part of the fluorescence light emitted out of the measurement area up over the plurality of consecutive angle positions of the intensity minimum to calculate an intensity sum, wherein the coding device is configured to assign the intensity sum as the value of the measured fluorescence light to the location defined by the position of the center of the measurement area in the sample.

20. The scanning fluorescence light microscope of claim 19, wherein the detector is configured to add the entire fluorescence light emitted out of the measurement area up over the plurality of angle positions of the intensity minimum to calculate the intensity sum.

21. The scanning fluorescence light microscope of claim 17, wherein the detector is configured to determine a direct component of the fluorescence light emitted out of the measurement area over the plurality of angle positions of the intensity minimum, wherein the coding device is configured to assign the direct component of the fluorescence light as the value of the measured fluorescence light to the location defined by the position of the center of the measurement area in the sample.

22. The scanning fluorescence light microscope of claim 17, wherein the scanning device has a tracking mode in which it scans the sample with the center of the measurement area in a direction of the angle positions of the intensity minimum in which the fluorescence light has its highest intensity.

23. The scanning fluorescence light microscope of claim 17, wherein the angle adjusting device is configured to distribute the plurality of angle positions of the intensity minimum uniformly over a full circle or solid angle about the center of the measurement area.

24. The scanning fluorescence light microscope of claim 17, wherein the angle adjusting device is configured to change the angle of the intensity minimum about the center of the measurement area continuously or in discrete steps.

25. The scanning fluorescence light microscope of claim 17, wherein the angle adjusting device has a wavefront modulator comprising a biaxial crystal or a spatial light modulator connected in series with at least one Pockels cell which is located downstream of the biaxial crystal or the spatial light modulator.

26. The scanning fluorescence light microscope of claim 17, wherein the angle adjusting device has at least two different partial light paths for the fluorescence inhibiting light which are section-wise separated from each other and which are each configured to adjust a different one of the plurality of angle positions of the intensity minimum.

27. A scanning fluorescence light microscope for multi-dimensional high-resolution imaging a path of a particle in a sample, the particle being marked with a fluorescence marker, the scanning fluorescence light microscope comprising:
  a fluorescence enabling light source providing fluorescence enabling light and configured to illuminate a measurement area in the sample with the focused fluorescence enabling light;
  a fluorescence inhibiting light source providing fluorescence inhibiting light and configured to subject a partial area of the measurement area to the fluorescence inhibiting light, wherein the partial area omits a center of the measurement area in that an intensity distribution of the fluorescence inhibiting light comprises a line-shaped or plane-shaped intensity minimum extending across the center of the measurement area, and wherein a minimal extension of the intensity minimum in a direction through the center of the measurement area is d/k, wherein k≥2, and where d is a diffraction-limited diameter of the measurement area in said direction;
  a detector configured to measure fluorescence light emitted from the sample out of the measurement area without spatial resolution within the measurement area; and
  a tracking device configured to update a position of the center of the measurement area in the sample;
  wherein the fluorescence inhibiting light source has an angle adjusting device configured to adjust a plurality of consecutive angle positions of the intensity minimum about the center of the measurement area, wherein the fluorescence enabling light source is configured to subject the measurement area to the fluorescence enabling light for each angle position of the intensity minimum,
  wherein the detector is configured to measure the fluorescence light emitted out of the measurement area for the plurality of consecutive angle positions of the intensity minimum about the center of the measurement area at a temporal resolution, and
  wherein the tracking device is configured to update a position of the center of the measurement area in the sample such that a predetermined temporal course of intensities of the fluorescence light measured over the plurality of angle positions of the line-shaped or plane shaped intensity minimum is maintained.

28. The scanning fluorescence light microscope of claim 27, wherein the detector comprises a point detector or a sensor array, the point detector or the sensor array being confocally arranged with regard to the measurement area and the only light-sensitive element of the detector.

29. The scanning fluorescence light microscope of claim 27, wherein the angle adjusting device is configured to distribute the plurality of angle positions of the intensity minimum uniformly over a full circle or solid angle about the center of the measurement area.

30. The scanning fluorescence light microscope of claim 27, wherein the angle adjusting device is configured to change the angle of the intensity minimum about the center of the measurement area continuously or in discrete steps.

31. The scanning fluorescence light microscope of claim 27, wherein the angle adjusting device has a wavefront modulator comprising a biaxial crystal or a spatial light modulator connected in series with at least one Pockets cell which is located downstream of the biaxial crystal or the spatial light modulator.

32. The scanning fluorescence light microscope of claim 27, wherein the angle adjusting device has at least two different partial light paths for the fluorescence inhibiting light which are section-wise separated from each other and which are each configured to adjust a different one of the plurality of angle positions of the intensity minimum.

\* \* \* \* \*